United States Patent
Jones et al.

(10) Patent No.: US 9,563,793 B2
(45) Date of Patent: *Feb. 7, 2017

(54) RFID READER LOCATION SELF-DISCOVERY

(71) Applicant: Wal-Mart Stores, Inc., Bentonville, AR (US)

(72) Inventors: Nicholaus Adam Jones, Fayetteville, AR (US); Alvin Scott Taulbee, Springdale, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/807,351

(22) Filed: Jul. 23, 2015

(65) Prior Publication Data

US 2016/0026834 A1 Jan. 28, 2016

Related U.S. Application Data

(63) Continuation of application No. 13/862,350, filed on Apr. 12, 2013, now Pat. No. 9,092,679.

(Continued)

(51) Int. Cl.
| | |
|---|---|
| *G06K 7/00* | (2006.01) |
| *G06K 7/10* | (2006.01) |
| *G06K 17/00* | (2006.01) |
| *G01S 5/02* | (2010.01) |
| *G01S 13/76* | (2006.01) |
| *G01S 1/68* | (2006.01) |

(52) U.S. Cl.
CPC ......... *G06K 7/10099* (2013.01); *G01S 5/0284* (2013.01); *G01S 5/0289* (2013.01); *G01S 13/765* (2013.01); *G06K 7/10009* (2013.01); *G06K 7/10356* (2013.01); *G06K 17/00* (2013.01); *G01S 1/68* (2013.01); *G06K 2017/0045* (2013.01)

(58) Field of Classification Search
CPC .......................... G06K 7/10356; G06K 17/00
See application file for complete search history.

(56) References Cited

U.S. PATENT DOCUMENTS

| | | |
|---|---|---|
| 6,424,264 B1 | 7/2002 | Giraldin et al. |
| 6,903,656 B1 | 6/2005 | Lee |
| | (Continued) | |

OTHER PUBLICATIONS

International Preliminary Report on Patentability issued in International Application No. PCT/US2014/023510, mailed Sep. 24, 2015.

(Continued)

*Primary Examiner* — Andrew Bee
(74) *Attorney, Agent, or Firm* — McCarter & English, LLP; David R. Burns

(57) ABSTRACT

A system and method of determining the location of a RFID reader is disclosed. The system comprises a first RFID reader, and at least one other RFID reader, and a processor. The RFID readers associate unique RFID tag information with at least one antenna that reads the information. The processor receives RFID data from the first RFID reader and the at least one other RFID reader and determines the location of the first RFID reader relative to the at least one other RFID reader based on the association of unique RFID tag information with at least one antenna of at least two readers.

20 Claims, 4 Drawing Sheets

Related U.S. Application Data

(60) Provisional application No. 61/788,696, filed on Mar. 15, 2013.

(56) References Cited

U.S. PATENT DOCUMENTS

| | | | |
|---|---|---|---|
| 7,005,968 | B1 | 2/2006 | Bridgelall |
| 7,242,306 | B2 | 7/2007 | Wildman et al. |
| 7,246,746 | B2 | 7/2007 | McNamara et al. |
| 7,540,419 | B2 | 6/2009 | Amitay et al. |
| 7,602,288 | B2 | 10/2009 | Broussard |
| 7,667,572 | B2 | 2/2010 | Husak et al. |
| 7,741,967 | B2 | 6/2010 | Valeriano et al. |
| 7,973,641 | B1 | 7/2011 | Huang |
| 8,519,848 | B2 | 8/2013 | Stern |
| 2003/0216969 | A1 | 11/2003 | Bauer et al. |
| 2005/0049914 | A1 | 3/2005 | Parish |
| 2005/0246248 | A1 | 11/2005 | Vesuna |
| 2006/0092040 | A1 | 5/2006 | Fishkin et al. |
| 2006/0114104 | A1* | 6/2006 | Scaramozzino .......... G01S 5/02 340/10.2 |
| 2006/0192003 | A1 | 8/2006 | Chung |
| 2006/0232382 | A1 | 10/2006 | Bauer et al. |
| 2006/0267733 | A1 | 11/2006 | Steinke et al. |
| 2007/0126716 | A1 | 6/2007 | Haverly |
| 2008/0061967 | A1 | 3/2008 | Corrado |
| 2008/0079540 | A1 | 4/2008 | Aull et al. |
| 2008/0316029 | A1 | 12/2008 | Hannah et al. |
| 2009/0201169 | A1 | 8/2009 | d'Hont et al. |
| 2009/0219170 | A1 | 9/2009 | Clark et al. |
| 2009/0231135 | A1 | 9/2009 | Chaves et al. |
| 2010/0019035 | A1 | 1/2010 | Larson et al. |
| 2010/0237994 | A1 | 9/2010 | Carraher et al. |
| 2011/0227704 | A1 | 9/2011 | Padmanabhan et al. |
| 2011/0309931 | A1 | 12/2011 | Rose |
| 2012/0086553 | A1 | 4/2012 | Wilkinson et al. |
| 2012/0086554 | A1 | 4/2012 | Wilkinson et al. |
| 2012/0092134 | A1 | 4/2012 | Stern et al. |
| 2012/0161967 | A1 | 6/2012 | Stern |
| 2012/0176227 | A1* | 7/2012 | Nikitin ............... G06K 7/10128 340/10.2 |
| 2012/0235817 | A1 | 9/2012 | Forster |
| 2013/0002879 | A1 | 1/2013 | Weber |
| 2013/0049925 | A1 | 2/2013 | Subramanian |
| 2014/0159872 | A1 | 6/2014 | Bekritsky et al. |
| 2014/0263635 | A1 | 9/2014 | Jones et al. |
| 2014/0263636 | A1 | 9/2014 | Jones et al. |
| 2014/0266621 | A1 | 9/2014 | Jones et al. |
| 2014/0306804 | A1 | 10/2014 | Stiefel et al. |

OTHER PUBLICATIONS

International Preliminary Report on Patentability issued in International Application No. PCT/US2014/024890, mailed Sep. 24, 2015.
International Preliminary Report on Patentability issued in International Application No. PCT/US2014/026698, mailed Sep. 24, 2015.
International Search Report and Written Opinion issued in International Application No. PCT/US2014/023510, mailed Jul. 14, 2014.
International Search Report and Written Opinion issued in International Patent Application No. PCT/US2014/024890, mailed Jul. 17, 2014.
International Search Report and Written Opinion issued in International Application No. PCT/US2014/026698, dated Oct. 2, 2014.

* cited by examiner

RFID READER LOCATION SELF-DISCOVERY

CROSS-REFERENCE TO RELATED APPLICATIONS

This application is a continuation of and claims the benefit of priority to U.S. patent application Ser. No. 13/862,350, filed on Apr. 12, 2013, which claims the benefit of priority to U.S. Provisional Patent Application Ser. No. 61/788,696, entitled "RFID Reader Location Self Discovery," filed on Mar. 15, 2013, each application is hereby incorporated by reference in its entirety.

BACKGROUND

Field of Invention

Embodiments relate generally to radio frequency identification (RFID) readers and the use of RFID tag information.

Description of Related Art

RFID is a wireless, non-contact system that uses radio-frequency electromagnetic fields to transfer data from a tag attached to an object for automatic identification and tracking. A conventional RFID system includes one or more RFID tags and an RFID reader. The RFID tag includes a transponder having a radio frequency integrated circuit and an antenna. The RFID reader includes an antenna and a transceiver. The transceiver includes a transmitter, a receiver and a decoder for processing data within the signal emitted by the RFID tag. When a RFID tag is within the activation range of the RFID reader, data can be transmitted by the RFID tag to the RFID reader.

Often when the RFID readers receive the RFID data, a single data interrogation mode is used. Some conventional approaches to utilize more than a single RFID tag interrogation mode include additional control circuit that is operably coupled to an RFID reader. A control circuit can facilitate using a first interrogation mode to read RFID tags and automatically switch to a second interrogation mode. This approach enable toggling back and forth between two different RFID tag interrogation modes.

RFID readers can be positioned utilizing frame components that comprise a portion of a 360 degree RFID reader antenna array. The frame components for RFID readers can be physically coupled to one another to form a multi-frame component system. The RFID reader antenna mounts can comprise part of a frame and can be configured to aim the reader's antenna out of the frame component. Positioning RFID readers in this manner may enable the RFID readers to identify the majority of RFID tags within a facility. When multiple readers were used together in a facility, it was known to position each RFID reader in a predetermined location such that the location of the RFID reader provided information about the location of the RFID tags it read.

SUMMARY

The inventors of the present invention recognized that installation of an RFID reader can be laborious, time consuming, and complicated. The inventors of the present invention recognized that those installing an RFID reader, whether in a new or an existing system, do not always put the RFID reader where it may have been designated to go. The present installation methods are not well suited for rapid installation or re-configuration. To streamline the installation process and adapt an installed system for new configurations, the inventors recognized a need to quickly and automatically identify a location of an installed RFID reader. Various embodiments, computer-implemented methods and systems are directed to determining a location of an RFID reader within a facility by self-identification.

In one aspect, embodiments of the invention are directed to a method of determining the location of a RFID reader. The method includes receiving first RFID data from a first RFID reader and second RFID data from a second RFID reader. The first RFID reader and the second RFID reader each comprise a plurality of antennas. The first RFID data associates the tag information with each of the plurality of antennas of the first RFID reader that read the tag information. The second RFID data associates tag information with each of the plurality of antennas of the second reader that read the tag information. Each RFID tag comprises unique tag information. Then a processer determines the location of the first RFID reader relative to the second RFID reader based on the associations in the first RFID data and the second RFID data.

In some embodiments, the method may include locating the RFID readers in an overhead position. An overhead position could be distributed throughout the facility supported either vertically or horizontally mounted to the upper structure or the lower structure of the facility. Additionally, a reader could be suspended overhead supported by a fixture placed on the floor. In some embodiments, the method may include identifying the orientation of the RFID reader. Identification of the orientation includes determining the direction of the antennas. In some embodiments, the method may include identifying each of the first plurality of antennas and each of the second plurality of antennas associated with the tag information from the first RFID tag. In some embodiments, the method may include identifying each of the first plurality of antennas and each of the second plurality of antennas associated with tag information from the second RFID tag.

In some embodiments, the method may include using the first RFID data and the second RFID data to determine the internal boundaries of a facility. A facility may include a retail environment, a warehouse, a receiving location, a shipping location or a garden center. Internal boundaries could be permanent dividers such as walls or reconfigurable fixtures. The internal boundaries could include a retail facility layout, or a merchandise area. In some embodiments, the comparison of the RFID data may include repeating the determination step over a duration of time. Repeating could include an occurrence at a fixed or a variable interval.

In some embodiments, the method may include comparing the RFID data with a process to determine the properties of the RFID tags. In some embodiments, the method may include comparing the RFID data with a processor to determine a quantity of the RFID tags. Quantity may include a total number of tags or a subset of tags having a particular characteristic. In some embodiments, the method may include comparing the RFID data with a process to determine a mix of the RFID tags. The mix may include various type of items or variations in item characteristics such as size, cut, quantity or color.

In some embodiments, the method may include receiving a third RFID data from a third RFID reader having a third plurality of antennas. The third RFID data associates the tag information with each of the third plurality of antennas that read the tag information. The location of the first RFID reader relative to the second RFID reader and the third RFID reader is determined based on the associations in the first RFID data, the second RFID data and the third RFID data.

In another aspect, embodiments of the present invention are directed to a system for determining a location of a RFID. The system comprises a first RFID reader, a second RFID reader and a processor. The first RFID reader has a first plurality of antennas configured to generate the first RFID data. The first RFID data associates tag information with each of the first plurality of antennas that read the tag information. The second RFID reader has a second plurality of antennas configured to generate the second RFID data. The second RFID data associates tag information with each of the second plurality of antennas that read the tag information. Each RFID tag is comprised of unique tag information. The processor is configured to receive the first RFID data and the second RFID data. The processor determines a location of the first RFID reader relative to the second RFID reader based on associations in the first RFID data and the second RFID data.

In some embodiments, the system may further include a third RFID reader having a third plurality of antennas configured to generate third RFID data. The third RFID data associates tag information with each of the third plurality of antennas that read the tag information. The processor is configured to receive the third RFID data. A location is determined relative to the first RFID reader and to the second RFID reader. The determination is based on associations in the first RFID data, the second RFID data and the third RFID data.

In some embodiments, the system may further include the first RFID reader where the first plurality of antennas are distributed 360° around the first RFID reader. In some embodiments, the system may further include the first RFID reader arranged in an overhead position. In some embodiments, the system may further include a processor configured to determine the internal boundaries of a facility based on the first RFID data and the second RFID data.

In some embodiments, the system may further include a processor configured to periodically compare the first RFID data and the second RFID data. In some embodiments, the system may further include a processor configured to compare the first RFID data and the second RFID data determined by a property of the RFID tags. In some embodiments, the system may further include a processor configured to compare the first RFID data and the second RFID data, based on the quantity of the RFID tags. In some embodiments, the system may further include a processor configured to compare the first RFID data and the second RFID data, based on the mix of the RFID tags.

In another aspect, a non-transitory computer-readable medium has stored thereon computer-executable instructions that when executed by at least one processor cause the first RFID data to be received from a first RFID reader. The first RFID reader comprising a first plurality of antennas. The first RFID data associates the tag information with each of the first plurality of antennas that read the tag information where each tag comprises unique information. The second RFID data received from a second RFID reader having a second plurality of antennas. The second RFID data associates tag information with each of the second plurality of antennas that read the tag information. The location of the first RFID reader relative to the second RFID reader is determined with a processor based on the computer-executable associations of the first RFID data and the second RFID data.

Any combination of embodiments is envisioned. Other objects and features will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
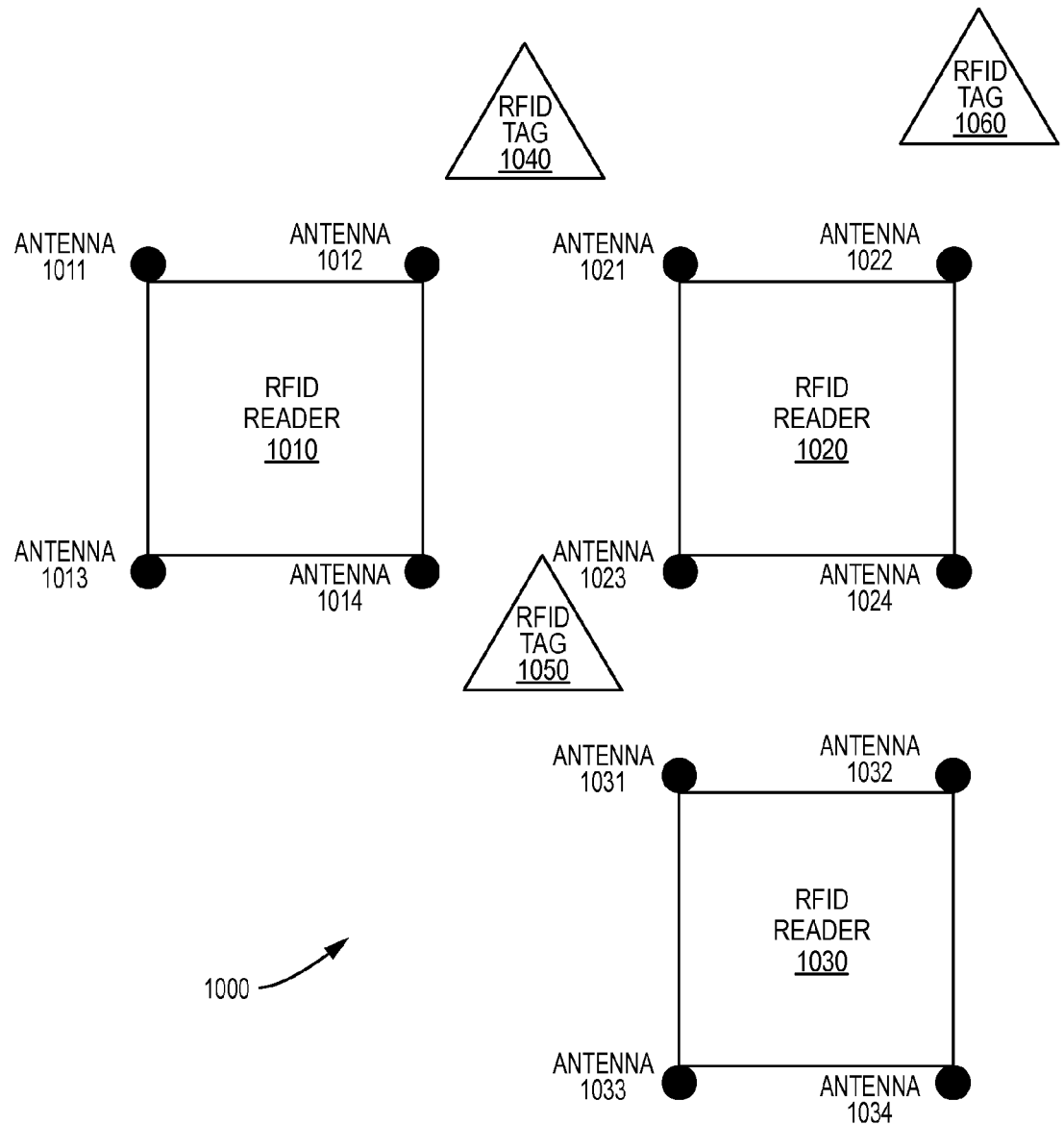
FIG. 1 is a block diagram of an exemplary arrangement of RFID readers in a facility in accordance with embodiments of the invention.

Embodiments of the invention use RFID data from at least two RFID readers. Each RFID reader features at least one antenna configured to read RFID tags. A processer in accordance with embodiments of the invention can identify information about the location of a first RFID reader based on information from at least one other RFID reader. According to various embodiments, the processor automatically determines information about the location of the first RFID reader installed within a facility by comparing the RFID data from RFID tags read by the first RFID reader to the RFID data from RFID tags read by at least one other RFID reader. When the RFID data indicates that both the first RFID reader and at least one other RFID reader read the at least one of the same RFID tags at approximately the same time, the processer can determine some information about the location of the first RFID reader relative to the at least one other RFID reader.

Each RFID tag makes unique tag identification information available. When an RFID reader features a plurality of antennas, the RFID reader may associate the tag information with each antenna that read the tag information. For example, an exemplary RFID reader may have a first antenna facing north and a second antenna facing south. The north-facing antenna may read tag information from a first RFID tag north of the RFID reader, but the south-facing antenna may not. Similarly, the south-facing antenna may read tag information from a second RFID tag south of the RFID reader, but the north-facing antenna may not. Accordingly, the exemplary RFID reader may associate the tag information of the first RFID tag with the north-facing antenna and the tag information of the second RFID tag with the south-facing antenna. Alternatively, if the first RFID tag were east of the exemplary RFID reader and both antennas of the exemplary RFID reader read the first RFID tag, the exemplary RFID reader may associate the tag information of the first RFID tag with both antennas. The RFID reader may then transmit the resulting RFID data. A processor according to embodiments of the invention thus may use any antenna associations in the RFID data from the exemplary RFID reader to automatically determine additional location information.

To the extent that additional RFID readers are available, embodiments of the invention may use information from more than two RFID readers. Accordingly, a processer in accordance with embodiments of the invention can identify information about the location of a first RFID reader based on information from more than one other RFID reader. According to various embodiments, the processor automatically determines information about the location of the first RFID reader installed within a facility by comparing the RFID data from RFID tags read by the first RFID reader with the RFID data from RFID tags read by any other available RFID readers. When the RFID data indicates that both the first RFID reader and more than one other RFID reader read at least one of the same RFID tags at approximately the same time, the processer can determine some information about the location of the first RFID reader relative to the more than one other RFID reader by applying geometry.

The location information is useful for automatic determination of the location and/or orientation of the first RFID reader location relative to other RFID readers within a system. Installation and configuration of new or replacement RFID readers within a system may be costly and time consuming. The inventors recognized that new or replacement RFID readers may not be installed in the expected location within a system. Accordingly, automated determination of the location and/or orientation that a new or replacement RFID reader may make installation easier and/or less expensive.

FIG. 1 illustrates an arrangement 1000 of RFID readers in a facility. In arrangement 1000, a first RFID reader 1010 features a first plurality of antennas 1011, 1012, 1013, 1014 configured to read RFID tags. Similarly, in arrangement 1000, a second RFID reader 1020 features a second plurality of antennas 1021, 1022, 1023, 1024. Those of skill in the art would recognize that each RFID reader could feature more or fewer antennas. The RFID reader may be any suitable RFID reader, such as a UHF EPC Global Class 1 reader, a Impinj Speedway Revolution, a Motorola FX9500, or an Alien 9900 RFID reader. In arrangement 1000 the RFID readers may be identical or the system may be comprised of RFID readers from a variety of manufactures.

The area within which an RFID reader antenna can read RFID tags is generally considered its read zone. When antennas can read the same RFID tag, they are deemed to have overlapping read zones. For example, two directional antennas in close proximity but oriented in opposite directions may not have overlapping read zones. On the other hand, when oriented in the same direction, the same two directional antennas may have overlapping read zones.

In arrangement 1000, the antennas of RFID readers 1010 and 1020 may be selected and positioned within the facility such that they have with overlapping read zones. For example, if the first plurality of antennas 1011, 1012, 1013, 1014 and the second plurality of antennas 1021, 1022, 1023, 1024 each have a 90 degree conical read zone pointed away from the corresponding RFID reader, RFID Reader 1010 and RFID Reader 1020 will have overlapping read zones provided that they are not too far away from each other. In particular, antenna 1012 and antenna 1021 will each be able to read RFID tag 1040. Similarly, antenna 1014 and antenna 1023 will each be able to read RFID tag 1050. If the distance between RFID tag 1060 and antenna 1012 is not too great, antenna 1012 and antenna 1022 will also each be able to read RFID tag 1060. Accordingly, RFID reader 1010 will read RFID tags 1040, 1050, and 1060 and produce RFID data associating tag information from RFID tags 1040 and 1060 with antenna 1012 and associating tag information from RFID tags 1050 with antenna 1014. Similarly, RFID reader 1020 will read RFID tags 1040, 1050, and 1060 and produce RFID data associating tag information from RFID tag 1040 with antenna 1021, associating tag information from RFID tag 1050 with antenna 1023, and associating tag information from RFID tags 1060 with antenna 1022. In accordance with embodiments of the invention, RFID data from RFID Readers 1010 and 1020 enables the relative location of the RFID Readers to be determined. In accordance with embodiments of the invention, a computing device 2000 of FIG. 2 may process the RFID data from RFID readers 1010 and 1020 to determine the location and/or orientation of RFID reader 1010 with respect to RFID reader 1020. Similarly, computing device 2000 of FIG. 2 may process the RFID data from RFID readers 1010 and 1020 to determine the location and/or orientation of RFID reader 1020 with respect to RFID reader 1010.

Those of skill in the art would recognize that RFID reader antennas need not have a directional read zone, need not have a conical read zone, need not be arranged as described in the foregoing example, and need not be equally spaced from other antennas. For example, each antenna of an RFID reader may be pointed in the same direction. Alternatively, antennas of an RFID reader may be arranged in 360 configuration about the RFID reader. Alternate antennas and antenna configurations are possible and within the scope of the invention.

One or more additional RFID readers, such as RFID reader 1030, may also be included in arrangement 1000 as illustrated in FIG. 1. At least one antenna of RFID reader 1030 may be selected and positioned such that it has at least one read zone that overlaps with the read zone of RFID reader 1010 and/or RFID reader 1020. For example, if RFID reader 1030 features a third plurality of antennas 1031, 1032, 1033, 1034 each have a 90 degree conical read zone pointed away from center of the reader, RFID Readers 1010, 1020, and 1030 will have overlapping read zones provided that they are not too far away from each other. In particular, antennas 1014, 1023, and 1031 will each be able to read RFID tag 1050. If the distance between RFID tag 1060 and antenna 1032 is not too great, antennas 1012, 1022, and 1032 will also each be able to read RFID tag 1060. Similarly, if the distance between RFID tag 1040 and antenna 1031 is not too great, antennas 1012, 1021, and 1031 will each be able to read RFID tag 1040. Accordingly, RFID reader 1030 will read RFID tags 1040, 1050, and 1060 and produce RFID data associating tag information from RFID tags 1040 and 1050 with antenna 1031 and associating tag information from RFID tags 1060 with antenna 1032. In accordance with embodiments of the invention, RFID data from RFID Readers 1010, 1020, and 1030 enables the relative location of the RFID Readers to be determined. In accordance with embodiments of the invention, computing device 2000 of FIG. 2 may process the RFID data from RFID reader 1030 to determine the location and/or orientation of RFID reader 1010 with respect to RFID reader 1030.

The processor 2002 determines if read zones from the first RFID reader 1010 antennas 1011, 1012, 1013, 1014 and the second RFID reader 1020 antennas 1021, 1022, 1023 and 1024 detect the same RFID tag 1040, 1050, 1060 information. The data association allows for the RFID readers 1010 and 1020 location to be determined based on the RFID tag 1040, 1050, 1060 information associated with the first RFID reader 1010 antenna 1011, 1012, 1013, 1014 and the second RFID reader 1020 reader antenna 1021, 1022, 1023, 1024. The processor determines if read zones from first RFID reader 1010, the second RFID reader 1020 and the third RFID reader 1030 detect the same RFID tag 1040, 1050, 1060 information. The data can allow for the RFID readers 1010, 1020 and 1030 location to be determined. Additionally, the RFID reader 1010, 1020 and 1030 position within the facility can be determined by the RFID tag 1040, 1050, 1060 data associations. Further data analysis can indicate the RFID reader 1010, 1020 and 1030 orientation within the facility. Whereas FIG. 1 illustrates three RFID readers 1010, 1020, and 1030 more or fewer RFID readers are possible and within the scope of the invention.

Figure 2:
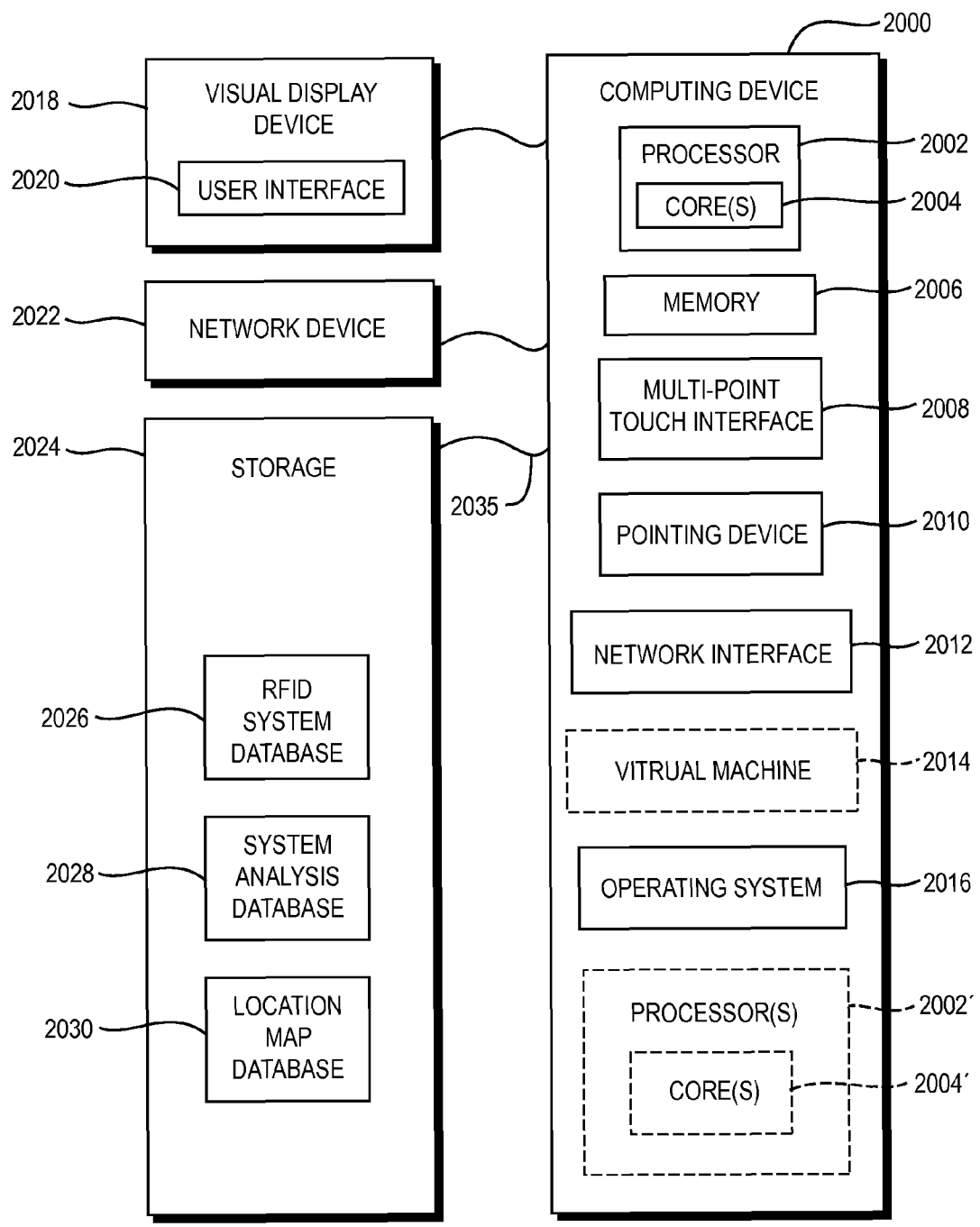
FIG. 2 is a flow diagram of one example of a process for determining a location of a RFID reader based on the association of multiple RFID readers in accordance with one embodiment.

FIG. 2 is a block diagram of an exemplary computing device 2000 that may be used to perform any of the methods provided by exemplary embodiments. The computing device 2000 may be any suitable computing or communication device or system, such as a workstation, desktop computer, server, laptop, handheld computer, tablet computer (e.g., the iPad™ tablet computer), mobile computing or communication device (e.g., the iPhone™ communication device), or other form of computing or telecommunications device that is capable of communication and that has sufficient processor power and memory capacity to perform the operations described herein.

The computing device 2000 includes one or more non-transitory computer-readable media for storing one or more computer-executable instructions, programs or software for implementing exemplary embodiments. The non-transitory computer-readable media may include, but are not limited to, one or more types of hardware memory, non-transitory tangible media (for example, one or more magnetic storage disks, one or more optical disks, one or more USB flash-drives), and the like. For example, memory 2006 included in the computing device 2000 may store computer-readable and computer-executable instructions, programs or software for implementing exemplary embodiments. Memory 2006 may include a computer system memory or random access memory, such as DRAM, SRAM, EDO RAM, and the like. Memory 2006 may include other types of memory as well, or combinations thereof.

The computing device 2000 also includes processor 2002 and associated core 2004, and optionally, one or more additional processor(s) 2002' and associated core(s) 2004' (for example, in the case of computer systems having multiple processors/cores), for executing computer-readable and computer-executable instructions or software stored in the memory 2006 and other programs for controlling system hardware. Processor 2002 and processor(s) 2002' may each be a single core processor or multiple core (2004 and 2004') processor.

Virtualization may be employed in the computing device 2000 so that infrastructure and resources in the computing device may be shared dynamically. A virtual machine 2014 may be provided to handle a process running on multiple processors so that the process appears to be using only one computing resource rather than multiple computing resources. Multiple virtual machines may also be used with one processor.

Figure 4:
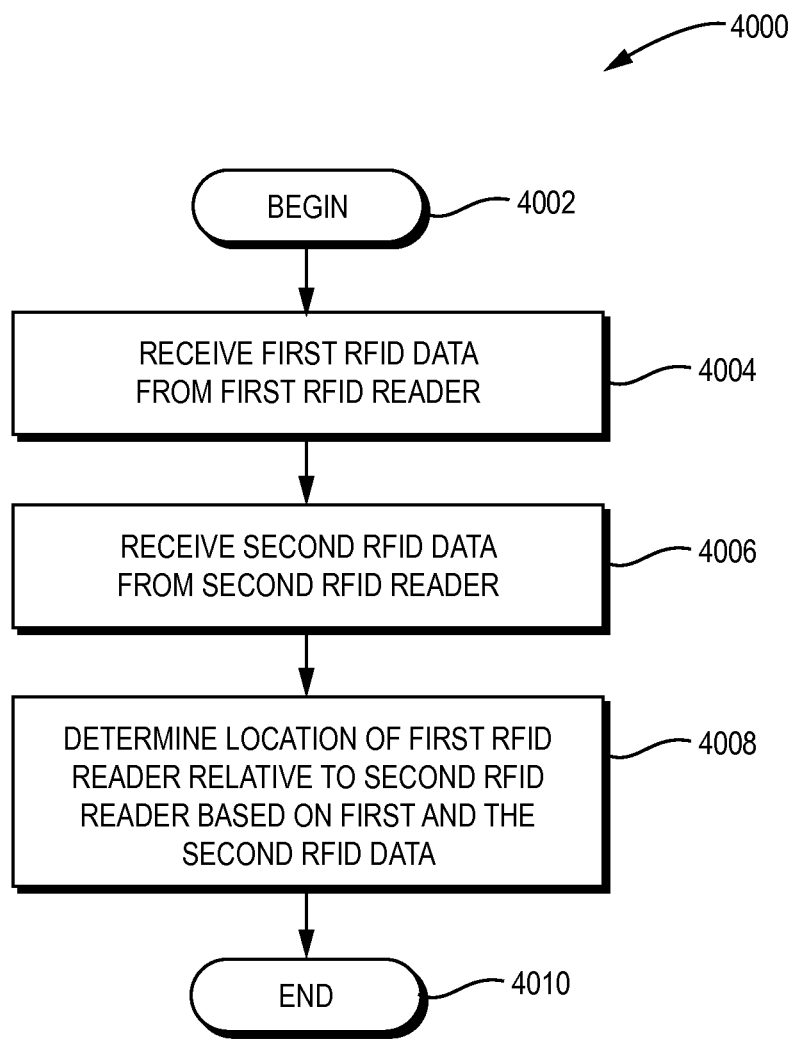
FIG. 4 is a block diagram of an exemplary network environment suitable for a distributed implementation of exemplary embodiments.

A user may interact with the computing device 2000 through a visual display device 2018, such as a computer monitor, which may display one or more user interfaces 2020 that may be provided in accordance with exemplary embodiments, for example, the exemplary interfaces illustrated in FIG. 4. The visual display device 2018 may also display other aspects, elements and/or information or data associated with exemplary embodiments, for example, views of location of the RFID readers, the internal boundaries of the facility, and the like. The computing device 2000 may include other input/output (I/O) devices for receiving input from a user, for example, a keyboard or any suitable multi-point touch interface 2008, a pointing device 2010 (e.g., a mouse). The keyboard 2008 and the pointing device 2010 may be coupled to the visual display device 2018. The computing device 2000 may include other suitable conventional I/O peripherals.

The computing device 2000 may include one or more storage devices 2024, such as a hard-drive, CD-ROM, or other computer readable media, for storing data and computer-readable instructions and/or software that implement exemplary embodiments of an location tracking system 2032 as taught herein. Exemplary storage device 2024 may also store one or more databases for storing any suitable information required to implement exemplary embodiments. The databases may be updated by a user or automatically at any suitable time to add, delete or update one or more items in the databases.

Exemplary storage device 2024 may store one or more system databases 2026 for storing information on RFID data association. System database 2026 may also include information on each RFID data read including, but not limited to, properties of the item, the type of geographical location at which the load is located, the RFID reader and RFID reader antenna receiving the tag information, the quantity of RFID tags, the mix of the RFID tags, and the like.

Exemplary storage device 2024 may store one or more system analysis databases 2028 for storing information on RFID data association that may be used in determining the position of a RFID reader, and the like. System analysis database 2028 may also include information on each system analysis method including, but not limited to, the location of the RFID data, the status of the RFID data, the type of the RFID data, and the like.

Exemplary storage device 2024 may store one or more location map databases 2030 for storing any suitable maps or mapping information on one or more facilities throughout which RFID data associations and RFID reader location self-discovery may be performed. Location map database 2030 may also include additional information including, but not limited to, the facility distribution of RFID readers throughout the area, tag information, product location information and the like.

The computing device 2000 may include a network interface 2012 configured to interface via one or more network devices 2022 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 2012 may include a built-in network adapter, network interface card, PCMCIA network card, card bus network adapter, wireless network adapter, USB network adapter, modem or any other device suitable for interfacing the computing device 2000 to any type of network capable of communication and performing the operations described herein.

The computing device 2000 may run any operating system 2016, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 2016 may be run in native mode or emulated mode. In an exemplary embodiment, the operating system 2016 may be run on one or more cloud machine instances.

Figure 3:
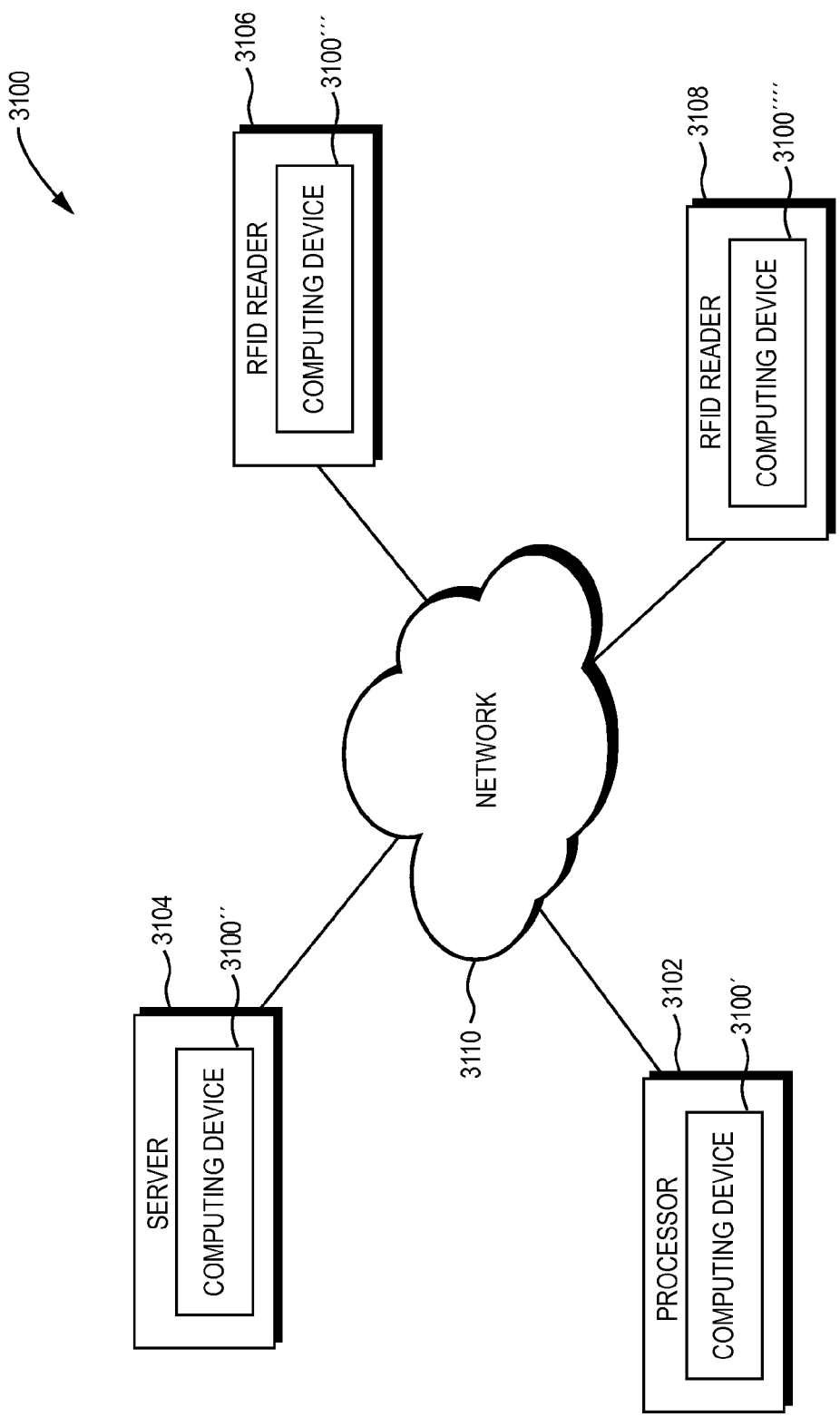
FIG. 3 is a block diagram of an exemplary computing device that may be used to perform any of the methods in the exemplary embodiments.

FIG. 3 is a block diagram of an exemplary network environment 3100 suitable for a distributed implementation of exemplary embodiments. The network environment 3100 may include one or more servers 3102 and 3104 coupled to one or more RFID readers 3106 and 3108 via a communication network 3110. The servers 3102 and 3104 may take the form of or include one or more computing devices 3100' and 3100", respectively. Similarly, the RFID readers 3106 and 3108 may take the form of or include one or more computing devices 3100''' and 3100"", respectively, that are similar to the computing device 1000 illustrated in FIG. 1.

The network interface 2012 and the network device 2022 of the computing device 2000 enable the servers 3102 and 3104 to communicate with the RFID readers 3106 and 3108 via the communication network 3110. As described with respect to FIG. 1, each RFID reader, such as RFID readers 3106 and 3108, may read RFID tags and produce RFID data including tag information from the RFID tags it reads. The communication network 3110 may include, but is not limited to, the Internet, an intranet, a LAN (Local Area Network), a WAN (Wide Area Network), a MAN (Metropolitan Area Network), a wireless network, an optical network, and the like. The communication facilities provided by the communication network 3110 are capable of supporting distributed implementations of exemplary embodiments.

In an exemplary embodiment, the servers 3102 and 3104 may provide the RFID readers 3106 and 3108 with computer-readable and/or computer-executable components or products under a particular condition, such as a license agreement. The computer-readable and/or computer-executable components or products may include those for providing and rendering an exemplary RFID reader interface. The RFID readers 3106 and 3108 may provide and render an exemplary RFID data using the computer-readable and/or computer-executable components and products provided by the servers 3102 and 3104. In an exemplary embodiment, the RFID reader 3106 and 3108 may transmit RFID data including RFID tag information defined by the user using the user interface to the servers 3102 and 3104 that may, in turn, automatically determine a relative location and orientation for one or more of the RFID readers.

Alternatively, in another exemplary embodiment, the RFID readers 3106 and 3108 may provide the servers 3102 and 3104 with computer-readable and computer-executable components or products under a particular condition, such as a license agreement. The computer-readable and computer-executable components or products may include those for providing exemplary RFID reader self-discovery information. For example, in an exemplary embodiment, the servers 3102 and 3104 may transmit RFID data association based on tag information using the computer-readable and/or computer-executable components and products provided by the RFID readers 3106 and 3108. In an exemplary embodiment, the servers 3102 and 3104 may transmit information on a RFID reader self-discovery operation defined by the user using the user interface to the RFID readers 3106 and 3108 that may, in turn, automatically execute the RFID reader data association operation.

FIG. 4 is a flow diagram of an exemplary process 4000 for determining the location of a RFID reader according to one embodiment. Process 4000 may be implemented, for example in network environment 3100. Process 4000 begins at block 4002. At block 4004, first RFID data is received from a first RFID reader, such as RFID reader 1010 of FIG. 1. The first RFID data associates tag information with the first RFID reader and with an antenna of the first RFID reader that read the tag information from an RFID tag. Each RFID tag is comprised of unique tag information. At block 4006, RFID data is received from a second RFID reader. The second RFID data associates tag information with the second RFID reader and with an antenna of the second RFID reader that read the tag information from an RFID tag. Although process 4000 illustrates block 4004 before block 4006 in the flow, RFID data may be received from the second RFID reader before RFID data is received from the first RFID reader. Similarly, RFID data may be received from the second RFID reader at approximately the same time that RFID data is received from the first RFID reader. Still alternatively, RFID data from the first and second RFID readers may be received as streams that overlap in time. RFID data may include information indicating when any RFID tag was read by the RFID reader.

At block 4008, a location of the first RFID Reader relative to the second RFID reader is determined based on the first and second RFID data. For example, a processor 2002 may compare the first RFID data with the second RFID data. Processor 2002 may compare the first RFID data with the second RFID data, upon command, whenever it receives the data, intermittently, and/or continuously. Processor 2002 may compare the first RFID data with the second RFID data to determine whether both the first RFID data with the second RFID data include any of the same unique tag information. If not, processor 2002 may determine that the first RFID reader is not near the second RFID reader. If processor 2002 determines that the first RFID data and the second RFID data include any of the same unique tag information, it may then determine if the unique tag information was read at approximately the same time. Alternatively, processor 2002 may only compare the first RFID data with the second RFID data to determine whether both the first RFID data with the second RFID data include any of the same unique tag information within a certain time range.

Unique tag information from an RFID tag may appear in the RFID data of multiple RFID readers. Unique tag information from an RFID tag may further appear in the RFID data associated with multiple antennas of any RFID reader. For example, unique tag information may appear in the first RFID data set and in the second RFID data set. Alternatively, unique tag information may appear in the first RFID data associated with multiple antennas. Accordingly, in block 4008, any antenna associations in the RFID data may be used to determine a location and/or orientation of the first RFID relative to the second RFID reader. Based on the association of the RFID data sets, a determination of the first RFID reader location relative to the second RFID reader locations is made. Processor 2002 may immediately analyze the RFID data comparison. If not, processor 2002 may store the comparison in the RFID system database 2026. Processor 2002 continues the analysis by comparing RFID data. Processor 2002 makes a determination of RFID reader location based on the appearance of the same unique tag information in the RFID data. Processor 2002 may create associations based on the commonality of the RFID data assigned to the RFID reader. Processor 2002 may store the analysis in the systems analysis database 2028. Processor 2002 may use the associations to determine the location of the first RFID reader relative to the second RFID reader. The processor 2002 may generate a location map and store the location map in the location map database 2030. Additionally, processor 2002 may utilize preexisting facility information stored in the location map database to generate the location map. Preexisting facility may include, facility structural information, merchandising information, store fixture information or department information. The process 4000 then ends at block 4010.

The RFID data may be analyzed to determine the first RFID reader relative to the second RFID reader at predetermined time increments and durations. The predetermined time increments may be fixed or variable. For example, the determination step can occur at intervals as frequently as 5 microseconds. Alternatively, the determination step may occur only during store reconfiguration or remerchandising events. The location determination is scalable and may include three or more readers. The RFID data associations may be configured to relate the position of multiple readers.

RFID data may be intermittently or continuously generated. RFID data associations can be performed at predetermined time increments and durations. The predetermined time increments may be fixed time periods or variable time periods. They may occur as frequently as every five microseconds. The RFID tags may be applied to fixtures, pallets, cases or items. RFID data associations can be compared over a period of time to monitor store facility changes or remerchandising a section of the facility.

The RFID readers may be distributed evenly or unevenly throughout the facility. The RFID readers may be arranged to segment or delineate the facility into particular zones. The RFID readers may be clustered in particular areas of the facility. The RFID readers may be arranged in a fifty by fifty foot grid arrangement. The RFID readers may be arranged in an overhead position. The RFID readers may be configured to attach to the ceiling or the roof of the facility or may be mounted to a support structure.

The RFID readers may be configured to have antennas arranged in 360 degree around the RFID reader or in any subset of the 360 degree arrangement. The RFID antennas may be positioned in a circular, rectangular, trapezoidal, hexagonal, pentagonal, square, triangular or diamond in arrangement. The RFID readers may have antennas of varying signal strength. The RFID readers may have a varying number of antennas. The RFID readers used in the system may have varying signal strength and reader sensitivity levels.

The internal boundaries of a facility may be determined by comparing the RFID data consisting of RFID tag information. The RFID data may be monitored and updated by the facility boundaries or information intermittently or can be continuous. The lack of RFID data may also be used to determine the internal boundaries of the facility. If a RFID reader antenna fails to generate RFID data, the lack of RFID data may indicate an aisle or racetrack area of the facility.

What is claimed is:

1. A method of determining a location or an orientation of an RFID reader comprising:
   receiving first RFID data from a first RFID reader comprising at least one antenna, wherein the first RFID data associates first tag information with at least one antenna of the first RFID reader in response to the at least one antenna of the first RFID reader reading the first tag information that uniquely identifies a first RFID tag;
   receiving second RFID data from a second RFID reader having at least one antenna, wherein the second RFID data associates the first tag information with the at least one antenna of the second RFID reader in response to the at least one antenna of the second RFID reader reading the first tag information; and
   determining at least one of a location or an orientation of the first RFID reader relative to the second RFID reader with a processor based on the associations in the first and the second RFID data.

2. The method of claim 1, further comprising:
   locating the first and the second RFID readers in an overhead position.

3. The method of claim 1, further comprising:
   determining the orientation of the first and the second RFID readers.

4. The method of claim 1, further comprising:
   identifying the at least one antenna of the first RFID reader and the at least one antenna of the second RFID reader associated with a second tag information that uniquely identifies a second RFID tag.

5. The method of claim 1, further comprising:
   determining an internal boundary of the facility based on the first and second RFID data.

6. The method of claim 5, further comprising:
   wherein determining the at least one of the location or the orientation of the first RFID reader relative to the second RFID reader based on the associations in the first and the second RFID data is repeated over a duration of time.

7. The method of claim 1, further comprising:
   determining properties of the first RFID tag.

8. The method of claim 1, further comprising:
   receiving third RFID data from a third RFID reader having at least one antenna, wherein the third RFID data associates second tag information with the at least one antenna of the third RFID data in response to the third RFID reader reading the second tag information that uniquely identifies at least one other RFID tag; and
   determining at least one of a location or an orientation of the first RFID reader relative to the second RFID reader and the third RFID reader based on the associations in the first, the second, and the third RFID data.

9. The method of claim 8, further comprising:
   determining a quantity of RFID tags based on the first RFID data, the second RFID data, and the third RFID data.

10. A system for determining a location or an orientation of a RFID reader comprising:
    a first RFID reader having at least one antenna configured to generate first RFID data, wherein the first RFID data associates first tag information with the at least one antenna of the first RFID reader in response to the at least one antenna of the first RFID reader reading the first tag information that uniquely identifies a first RFID tag;
    a second RFID reader having at least one antenna configured to generate second RFID data, wherein the second RFID data associates the first tag information with the at least one antenna of the second RFID reader in response to the at least one antenna of the second RFID reader reading the first tag information;
    a processor configured to receive the first RFID data and the second RFID data and to determine at least one of a location or an orientation of the first RFID reader relative to the second RFID reader based on associations in the first RFID data and the second RFID data.

11. The system of claim 10, further comprising:
    a third RFID reader having at least one antenna configured to generate third RFID data, wherein the third RFID data associates the first tag information with the at least one antenna of the third RFID reader in response to the at least one antenna of the third RFID reader reading the first tag information; and wherein the processor is further configured to receive the third RFID data and to determine at least one of a location or an orientation of the first RFID reader relative to the second RFID reader and the third RFID reader based on associations in the first RFID data, the second RFID data, and the third RFID data.

12. The system of claim 10, wherein the first RFID reader includes a plurality of the antennas that are distributed 360° around the first RFID reader.

13. The system of claim 10, wherein the first RFID reader is arranged in an overhead position.

14. The system of claim 10, wherein the processor is further configured to determine an internal boundary of a facility based on the first RFID data and the second RFID data.

15. The system of claim 10, wherein the processor is further configured to periodically compare the first RFID data and the second RFID data.

16. The system of claim 10, wherein the first RFID reader generates a third RFID data, wherein the third RFID data associates second tag information with the at least one antenna of the first RFID reader in response to the at least one antenna of the first RFID reader reading the second tag information that uniquely identifies at least one other RFID tag.

17. The system of claim 16, wherein the processor is further configured to compare the first RFID data, the second RFID data and the third RFID data based on a property of the first RFID tag and the second RFID tag.

18. The system of claim 16, wherein the processor is further configured to compare the first RFID data, the second RFID data and the third RFID data based on a quantity of RFID tags.

19. A non-transitory computer readable medium comprising instructions configured to cause a computer processor to execute a method comprising:

receiving first RFID data from a first RFID reader comprising at least one antenna, wherein the first RFID data associates first tag information with the at least one antenna of the first RFID reader in response to the at least one antenna of the first RFID reader reading the first tag information that uniquely identifies a first RFID tag;

receiving second RFID data from a second RFID reader having at least one antenna, wherein the second RFID data associates the first tag information with the at least one antenna of the second RFID reader in response to the at least one antenna of the second RFID reader reading the first tag information; and determining at least one of a location or an orientation of the first RFID reader relative to the second RFID reader based on the associations in the first and the second RFID data.

20. The medium of claim 19, wherein execution of the instructions by the computer processor cause the computer processor to determine an internal boundary of the facility based on the first and second RFID data.

* * * * *